United States Patent [19]

Burnup et al.

[11] 4,362,868

[45] Dec. 7, 1982

[54] PLASTICIZED CELLULOSE POLYMERS

[75] Inventors: Michael Burnup, Swindon; Gerard F. Hayes, Broxbourne; Norman C. Paul, Hoddesdon, all of England

[73] Assignee: The Secretary of State for Defence in Her Britannic Majesty's Government of the United Kingdom of Great Britian and Northern Ireland, London, England

[21] Appl. No.: 188,663

[22] Filed: Sep. 19, 1980

[30] Foreign Application Priority Data

Sep. 24, 1979 [GB] United Kingdom ............... 7932970

[51] Int. Cl.³ .............................................. C08G 18/10
[52] U.S. Cl. ............................... 536/66; 102/290; 106/169; 149/10; 149/11; 149/12; 149/19.7; 536/68; 536/85
[58] Field of Search ............. 536/66, 68, 85; 106/169; 102/290; 149/19.7, 11, 12, 10

[56] References Cited

U.S. PATENT DOCUMENTS

| | | | |
|---|---|---|---|
| 1,613,451 | 1/1927 | Glover et al. | 536/66 |
| 1,880,558 | 10/1932 | Webber et al. | 536/66 |
| 1,902,280 | 3/1933 | Hagedorn et al. | 536/66 |
| 2,032,748 | 3/1936 | Haskins | 536/66 |
| 2,098,336 | 11/1937 | Dreyfus | 536/66 |
| 2,987,388 | 6/1961 | Stanley | 102/290 |
| 3,108,433 | 10/1963 | De Fries et al. | 102/290 |
| 3,157,025 | 11/1964 | Herring | 102/290 |
| 3,202,557 | 8/1965 | Kaufman | 260/32.8 |
| 3,215,028 | 11/1965 | Pitchford | 102/290 |
| 3,250,829 | 5/1966 | Wall | 102/290 |
| 3,903,076 | 9/1975 | Krumel et al. | 536/85 |
| 3,909,323 | 9/1975 | Flanagan et al. | 149/19.7 |
| 3,991,565 | 11/1976 | Gordon et al. | 102/290 |
| 4,226,981 | 10/1980 | Onda et al. | 536/66 |

FOREIGN PATENT DOCUMENTS

| | | |
|---|---|---|
| 704567 | 2/1954 | United Kingdom . |
| 732547 | 6/1955 | United Kingdom . |
| 734414 | 8/1955 | United Kingdom . |
| 737919 | 10/1955 | United Kingdom . |

Primary Examiner—A. Lionel Clingman
Attorney, Agent, or Firm—Cushman, Darby & Cushman

[57] ABSTRACT

Plasticized cellulose polymers comprise a base polymer having a chain of $\beta$-anhydroglucose units joined by ether linkages and having ether substituents, with at least one of the units being additionally substituted, by esterification of at least one hydroxyl group, by at least one ester group, which contains at least two carbon atoms and is chemically unreactive.

Preferably the ester group contains four or more, most preferably five, carbon atoms. The carbon chains of the ester groups may be straight or branched.

These internally plasticized celluloses may be prepared by, for example, reacting the base polymer with a carboxylic acid in xylene or with an acid chloride or anhydride in pyridine. They are useful in particular as inhibitor coatings for rocket motor propellants and in general wherever cellulose polymers are employed.

17 Claims, 1 Drawing Figure

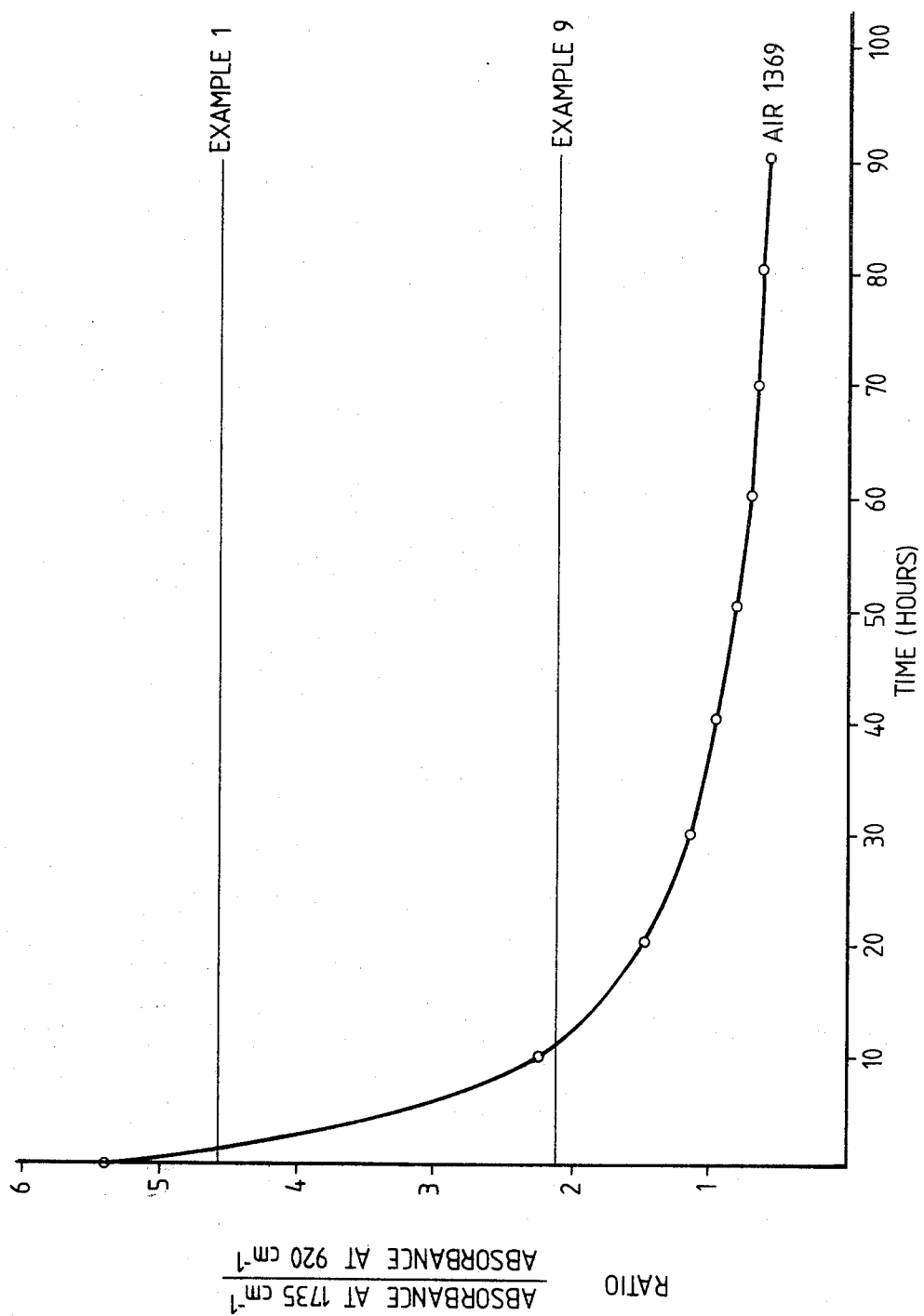

PLASTICIZED CELLULOSE POLYMERS

The present invention relates to internally plasticised cellulose polymers.

Base resins for plastics materials are commonly mixed with a relatively small proportion of a comparatively low molecular weight compound in order to improve the workability of the resin and to improve its properties in the longer term, eg to prevent it from shrinking and cracking. Such "plasticisers" are normally merely physically mixed with the base resin and are susceptible to loss therefrom by evaporation, migration or extraction. By chemically attaching side chains of about the same size as such plasticiser molecules to the resin, the resin can be "internally plasticised" and the effect in this case is permanent since the plasticising side chains will not become detached from the resin molecule and so no loss of "plasticiser" can occur.

It will be appreciated that in a sense any side chain attached to, for example, the cellulose molecule will be a plasticising side chain, so that for example even ethyl cellulose can be said to be internally plasticised to a degree. However we have now found that cellulose polymers which contain mixed ether and ester side chains are surprisingly very effectively plasticised. Accordingly, the present invention provides cellulose ether polymers comprising a base polymer having a chain of β-anhydroglucose units joined by ether linkages and having ether substituents wherein at least one of the β-anhydroglucose units in the chain of the base polymer is additionally substituted, by esterification of at least one hydroxyl group on the chain, by at least one ester group which contains at least two carbon atoms and is chemically unreactive (as herein defined).

The side chains preferably contain four or more carbon atoms, most preferably five or more carbon atoms. There is no particular upper limit on the length of the side chains which may be present, though relatively short chains are generally preferred since the small side chain-forming compounds react more readily than do the larger ones.

The side chains preferably comprise from 5 to 20% by weight of the base polymer, most preferably about 10% by weight, though plasticising effects may be noted where the side chain proportion is less than 5%. Where the proportion of side chain is above about 30%, no additional plasticising effect will generally be apparent and therefore the incorporation of such relatively large amounts of side chain material is not advantageous. In any case the incorporation of excessive amounts of side chain will cause the properties of the polymer itself to be swamped and in particular the strength of the polymer may be lost. However incorporation of more moderate amounts of side chain may be a means of modifying certain properties of the polymer and the choice of the side chain-forming compound may be influenced accordingly.

The side chains may be straight or branched. They must be chemically unreactive by which term is herein meant that the chains must either contain no functional groups or may contain functional groups provided that they do not interact with each other or with the polymer chain. This is a necessary requirement in order to prevent the polymers from undergoing cross-linking reactions which would lead to the formation of an intractable mass. The incorporation of non-cross-linking functional groups in the side chains may for example be desirable in order to obtain cellulose polymers with specifically modified properties.

As to the cellulose polymer backbone, any cellulose ether may be used provided that it has at least some free hydroxyl groups along its length at which the side chains can be substituted to form internally plasticised polymers according to the invention.

The side chains are introduced into the cellulose polymer backbone by reacting a suitable molecular species with the polymer, preferably a compound which possesses only a group or groups which is or are reactive solely with the available hydroxyl groups on the cellulose polymer backbone. Other groups if present should be of low activity or most preferably not groups which might react with the principle functionality. Suitable side chain forming compounds are aliphatic or aromatic monobasic acids, and acid chlorides or anhydrides. Isocyanates may be used to form a urethane side chain.

The method of carrying out chemical linking of side chains to the cellulose polymer may be any one of the conventional procedures used for effecting condensation processes. Thus, for example, a sample of the cellulose polymer to be treated may be refluxed in a suitable solvent such as benzene, xylene, toluene, pyridine, butylacetate or methylene chloride in the presence of the side chain-forming compound, which may be a monobasic acid, an acid anhydride or chloride or an isocyanate. Xylene is the preferred solvent for the reaction between the cellulose and monobasic acids because it forms an azeotropic mixture with the water produced in the reaction and the water is therefore readily removed from the reaction mixture by azeotropic distillation, facilitating the reaction. However for the reactions of the cellulose with acid anhydrides and chlorides, pyridine is the preferred solvent. Apart from solvent effects the extent of side chain incorporation is affected in well known manner by the choice of conditions for the reaction.

The progress of the reaction can be followed by taking aliquots of the reaction mixture at suitable intervals, purifying the product and recording the development of the ester peak at about 1740 $cm^{-1}$ in the infrared spectrum. Depending upon the reactivity of the side chain-forming compound, the reaction may take from 1 to 90 hours to complete. Catalysts for the esterification reaction can be used but care must be taken since acid catalysts tends to hydrolyse the ether linkages in the ethyl cellulose and reduce its molecular weight. After the reaction is completed, the polymer may be purified by a double precipitation into eg hexane to remove any unreacted 'plasticiser' compound.

The use of extruded plasticised ethyl cellulose as inhibitor coatings for rocket motor propellants is well established. In addition to the problem of plasticiser migration that is experienced with conventional externally plasticised ethyl cellulose there is an additional disadvantage in the use of these materials in rocket motors. This additional drawback is the diffusion of nitroglycerine (NG) from the propellant composition into the plasticised ethyl cellulose. It is a further advantage of the internally plasticised materials of the present invention that their NG uptake is substantially lower than that of conventional externally plasticised ethyl cellulose. Thus NG uptake by a valeryl modified ethyl cellulose according to the present invention is between 25 and 40 times less than the NG uptake by ethyl cellulose externally plasticised with dibutyl—and diethyl phthalate. It follows that the materials of the present invention may be advantageously used as inhibitor coatings for rocket motor propellants as well as being generally useful wherever cellulose polymers are employed.

The invention will now be further illustrated by way of example only, by reference to some specific, internally plasticised cellulose polymers, to methods of preparing them, to compression studies thereon and to nitroglycerine uptake thereby. In the examples the amount of the side chain-forming compound which has been grafted on to the cellulose polymer is indicated generally by the strength of the ester peak at 1740 cm$^{-1}$ shown by the product. Where the amount of the side chain-forming compound incorporated exceeds about 30% by weight of the base polymer, the extent of grafting is said to be high and where the side chain in the product comprises less than about 5% by weight of the base polymer, the extent of grafting is described as low. A medium extent of grafting lies between these limits, but will in general mean that the side chain comprises between about 10 and 20% by weight of the base polymer.

EXAMPLE 1

8 g of ethyl cellulose (Grade N200 from Hercules Inc) was dissolved in 250 cm$^3$ of xylene and 24 g of octanoic acid added. The reactants were stirred at 20 revs/min for 48 hours under reflux, water formed during the reaction being removed using a Dean & Stark separator. The rate of esterification was followed by extracting small aliquots at suitable intervals, purifying the product by precipitation into hexane, re-dissolving it in xylene and reprecipitating it into hexane, and recording the i.r. spectrum of the product. The extent of esterification is then revealed by the size of the C=O absorption peak at about 1740 cm$^{-1}$. On completion of the reaction the polymer was then purified by a double precipitation into hexane to remove any unreacted plasticizer present.

The softening point of the product polymer was determined using hot stage microscopy and was found to be 125°–130° C. Examination by IR spectroscopy and NMR spectroscopy showed that the degree of side chain grafting in this product was high, ie the side chains comprised 30% or more by weight of the base polymer.

EXAMPLE 2

2 g of ethyl cellulose (Grade N200 from Hercules Inc) was dissolved in 100 cm$^3$ of xylene and 8 g of octanoic acid added. The reactants were heated under reflux for 36 hours and then isolated and purified as in Example 1 to give a polymer with a softening point of 130°–135° C.

EXAMPLE 3

The procedure of Example 1 was repeated using 5 g of ethyl cellulose and 2 g of dodecanoic acid in 100 cm$^3$ of xylene and terminating the reaction after only 6 hours. The polymer obtained after purification had a softening point of 115°–120° C. though IR spectroscopy showed that only a small amount of ester linkages had been formed, i.e. with the side chains comprising no more than 5% by weight of the base polymer.

EXAMPLES 4 to 14

A series of internally plasticised ethyl cellulose polymers was made using Grade N200 cellulose material and a number of different monobasic acids. The methods of preparation used were broadly similar to those employed in Examples 1 to 3 above, and the plasticised polymers obtained were in each case characterized by IR and NMR spectroscopy and gel permeation chromatography (GPC) and in each case shown to contain grafted side chains linked to the ethyl cellulose through ester groups. The softening points of the product polymers were also determined using hot stage microscopy. The results of these measurements are shown in Table 1 which also shows, for comparative purposes, the corresponding values for unmodified (commercial) ethyl cellulose (N200 grade) and for a composition of commercial cellulose containing, as external plasticizers, a mixture of diethyl and dibutyl phthalates. The results show that the softening points of the internally plasticized polymers were in all cases less than that of the commercial sample and at least as low as that of the externally plasticized material, showing that satisfactory plasticization had been achieved in every instance.

TABLE 1

| Example No | Monobasic acid as Internal Plasticiser | Weight Ratio of Reactants (Base Polymer/ Plasticiser) | Reflux Solvent | Reflux Time (hrs) | Extent of grafting[a] | Softening point (°C.) |
|---|---|---|---|---|---|---|
| (comparative) | Commercial ethyl cellulose (N200) | — | — | — | — | 165–170 |
| (comparative) | N200 plus diethyl and dibutyl phthalate (AIR1369)[b] | 10/1 | — | — | — | 150–155 |
| 1 | octanoic acid | ¼ | xylene | 48 | high | 125–130 |
| 2 | octanoic acid | ¼ | xylene | 36 | — | 130–135 |
| 3 | dodecanoic acid | 5/2 | xylene | 6 | low | 115–120 |
| 4 | dodecanoic acid | 10/1 | xylene | 6 | low | 115–120 |
| 5 | octanoic acid | 3/10 | xylene | 36 | high | 130–135 |
| 6 | pentanoic acid | 10/1 | xylene | 6 | low | 145–150 |
| 7 | pentanoic acid | 1/5 | xylene | 36 | medium | 130–135 |
| 8 | decanoic acid | 10/1 | xylene | 6 | low | 115–120 |
| 9 | butyric acid | 8/22 | xylene | 48 | high | 135–140 |
| 10 | pentanoic acid | 1/5 | butyl acetate | 36 | medium | 155–160 |
| 11 | pentanoic acid | 1/5 | chloroform | 36 | low | 155–160 |
| 12 | isovaleric acid | 1/5 | xylene | 36 | low | 140–145 |
| 13 | trimethylacetic acid | 1/5 | xylene | 36 | low | 150–155 |

TABLE 1-continued

| Example No | Monobasic acid as Internal Plasticiser | Weight Ratio of Reactants (Base Polymer/ Plasticiser) | Reflux Solvent | Reflux Time (hrs) | Extent of grafting[a] | Softening point (°C.) |
|---|---|---|---|---|---|---|
| 14 | acetic acid | ½ | xylene | 48 | high | 135–140 |

Notes:
[a] The extent of grafting was judged by the strength of the i.r. absorption at about 1735 cm$^{-1}$
[b] AIR1369 refers to Specification No. AIR1369 of the Inspectorate of Armaments (U.K. Ministry of Defence).

Some of the internally-plasticized polymers were also subjected to simulated rapid ageing tests to check for plasticiser loss. These involved preparing three samples of each polymer in the form of discs, by moulding at 150° C. and under a pressure of 90 psi. Each disc is weighed at the start and then after 24 hours and again after 40 hours of heating in vacuo at 100° C. The results obtained for the modified polymer of Example 9 are set out in Table 2, together with comparative data for the commercial (unmodified) polymer and for the standard externally plasticized composition AIR1369. The results confirm that the internally plasticised ethyl cellulose polymers do not lose their plasticised components, the small weight loss observed being due to some degradation of the polymer chain since it is also observed with the sample of commercial ethyl cellulose (Hercules Inc grade N200) containing no plasticiser. The standard composition AIR1369 shows a much greater weight loss (of more than 2% of its weight after 40 hours exposure) than does the internally plasticized sample, showing that the plasticizer is lost where it is not combined with the polymer.

Plasticiser weight loss is also illustrated graphically in the accompanying FIGURE which shows loss in terms of the strength of the i.r. absorbance at 1737 cm$^{-1}$ of the ester groups in the plasticiser. The absorbance at 1737 cm$^{-1}$ is divided by the absorbance at 920 cm$^{-1}$ to provide an internal reference standard which avoids the necessity of measuring the thickness of each polymer disc, since the 920 cm$^{-1}$ absorbance varies only with sample thickness. From the graph in the accompanying FIGURE it will be seen that plasticiser is very rapidly lost from the externally plasticised composition AIR1369 while for the two samples of internally plasticised polymer according to this invention no weight loss occurs. Although the accelerated ageing trials cannot reproduce the exact conditions of long term storage, it is inferable from a showing that plasticiser is rapidly lost in the tests that loss and migration will occur on long term storage of the plasticised polymers, but not from the internally plasticised polymers referred to in this invention.

TABLE 2

| Example No | Initial Weight, g | Weight after 24 hours, g | Weight after 40 hours, g | Weight loss % after 40 hr |
|---|---|---|---|---|
| (N200) | 0.4081 | 0.4071 | 0.4056 | 0.62 |
|  | 0.5516 | 0.5496 | 0.5488 | 0.51 |
|  | 0.4774 | 0.4758 | 0.4645 | 0.61 |
| (AIR1369) | 0.6795 | 0.6693 | 0.6661 | 1.97 |
|  | 0.9669 | 0.9489 | 0.9439 | 2.38 |
|  | 0.5349 | 0.5266 | 0.5222 | 2.37 |
| 9 | 0.4539 | 0.4534 | 0.4515 | 0.53 |
|  | 0.4712 | 0.4709 | 0.4689 | 0.49 |
|  | 0.4978 | 0.4965 | 0.4949 | 0.62 |

Note:
AIR1369 refers to Specification No AIR1369 of the Inspectorate of Armaments (U.K. Ministry of Defence).

EXAMPLES 15–24

Ethyl cellulose (2 g.) was dissolved in pyridine (100 cc) in a 250 cc round bottomed flask. Acetic or propionic anhydride (10 cc) was added and the mixture was refluxed for between 0.5 hr. and 4 hr. The reaction mixture was then allowed to cool and the polymer was precipitated by addition to distilled water. The polymer was reprecipitated by dissolution in THF (100 cc.) and precipitated in distilled water. The polymer was then washed with water and dried to constant weight in a vacuum oven at 60° for 20 hr. at 30 mm. Hg. The properties of the products are shown in Table 3.

EXAMPLES 25–38

Ethyl cellulose (10 g.) was dissolved in pyridine (500 cc.) in a 2 liter round bottomed flask. Trimethylacetic or valeric anhydride (50 cc.) was added and the mixture was refluxed for between 0.5 hr. and 6 hr. The polymer was precipitated as a sticky mass, by addition of the solution to warm (60°) distilled water. It was then removed from its aqueous environment, dissolved in tetrahydrofuran (THF) and reprecipitated by addition of the THF solution to 0.2% aqueous sodium carbonate (8 liter). The reprecipitation process in THF and aqueous sodium carbonate was repeated and the polymer was then allowed to stand in distilled water for about 2 hr., in order to promote the complete removal of sodium carbonate and THF. Finally the polymer was filtered and dried to constant weight in a vacuum oven at 90° for 20 hr. at 30 mm. Hg. The properties of the products are shown in Table 3.

TABLE 3

| Example No. | Anhydride | Reaction Time (hr.) | Liquefaction Temperature (°C.) | Intrinsic Viscosity ($\eta$) | Tg (°C.) |
|---|---|---|---|---|---|
| Ethyl cellulose (comparative) | — | — | 205–210 | 2.25 | 126 |
| 15 | Acetic | ½ | 210–213 | 2.56 | 132 |
| 16 | Acetic | 1 | 210–213 | 2.75 | 128 |
| 17 | Acetic | 2 | 215–220 | 2.30 | 132 |
| 18 | Acetic | 3 | 230–235 | 2.61 | 127 |
| 19 | Acetic | 4 | 230–235 | 2.53 | 124 |
| 20 | Propionic | ½ | 203–205 | 2.47 | 125 |
| 21 | Propionic | 1 | 210–215 | 2.45 | 128 |

TABLE 3-continued

| Example No. | Anhydride | Reaction Time (hr.) | Liquefaction Temperature (°C.) | Intrinsic Viscosity ($\eta$) | Tg (°C.) |
|---|---|---|---|---|---|
| 22 | Propionic | 2 | 213–216 | 3.07 | 118 |
| 23 | Propionic | 3 | 212–215 | 2.56 | 121 |
| 24 | Propionic | 4 | 213–216 | 2.82 | 115 |
| 25 | Trimethylacetic | ½ | 200–205 | 2.71 | 123 |
| 26 | Trimethylacetic | 1 | 205–210 | 2.52 | 125 |
| 27 | Trimethylacetic | 2 | 200–205 | 2.49 | 127 |
| 28 | Trimethylacetic | 3 | 205–210 | 2.62 | 133 |
| 29 | Trimethylacetic | 4 | 205–210 | 2.67 | 130 |
| 30 | Trimethylacetic | 5 | 210–215 | 2.51 | 140 |
| 31 | Trimethylacetic | 6 | 208–215 | 2.66 | — |
| 32 | Valeric | ½ | 194–197 | 2.51 | 118 |
| 33 | Valeric | 1 | 194–197 | 2.47 | 109 |
| 34 | Valeric | 2 | 194–197 | 2.48 | 109 |
| 35 | Valeric | 3 | 195–200 | 2.72 | 111 |
| 36 | Valeric | 4 | 195–200 | 2.42 | 105 |
| 37 | Valeric | 5 | — | 2.42 | — |
| 38 | Valeric | 6 | — | 2.58 | 108 |

Compression moulding studies on the polymers produced in Examples 15–38

It was found that the acetyl substituted (15–19) and propionyl substituted (20–24) ethyl cellulose N-200 could not be moulded satisfactorily, under the conditions employed. In all cases the polymer did not flow properly and the film cracked on being taken out of the press. By contrast the trimethylacetyl substituted ethyl celluloses (25–31) flowed freely and could be moulded satisfactorily as could the valeryl substituted materials (32–38) producing the clear transparent films that were more flexible than films derived from unsubstituted ethyl cellulose.

The varying plasticising properties may be explained, although the invention is in no way limited by this explanation, by the relative sizes and shapes of the groups. Thus the acetyl and propionyl groups are of comparable size to the ethyl groups and hence do not significantly push apart neighbouring ethyl cellulose chains. The trimethylacetyl and valeryl groups, however, are sufficiently bulky to show significant plasticising effects. The liquifaction and glass transition temperatures are also affected by the degree of resistance to chain rotation resulting from the substitution. Thus groups which do not push the chains apart, such as acetyl, or are so bulky as to form barriers to rotation, such as trimethylacetyl, tend, if anything, to increase liquefaction temperatures and Tg. Conversely more linear substituent groups which increase the separation of chains without introducing significant further restrictions to rotation tend to reduce these temperatures. Thus, for example, the valeryl group is preferred as a substituent group to the isomeric highly branched trimethylacetyl group.

A still further advantage of valeryl substituents over their trimethylacetyl isomers, is that, whereas the reaction of trimethylacetic anhydride with ethyl cellulose introduced only a small number of substituent groups, even if the reaction was continued for 6 hr., the esterification of ethyl cellulose with valeric anhyride introduced a large number of substituent groups, and the degree of substitution could be increased still further by allowing the reaction to proceed for longer than 6 hr. This difference in behaviour can again be explained by the difference in steric behaviour between branched and straight chain isomeric substituents.

Nitroglycerine absorption on modified ethyl celluloses.

Test 1 (comparative)

Moulded pieces (2 mm thick) of N-200 ethyl cellulose externally plasticised with dibutyl and diethyl phthalate prepared to Specification No AIR 1369 of the Inspectorate of Armaments (Ministry of Defence)) were cut into squares (approx 20 mm×20 mm) and weighed. The test pieces were laid on polyethylene caps containing 2–3 ml of nitroglycerine and sandwiched between two metal backing plates. The assembly was then inverted to allow the nitroglycerine to contact the polymer surface over a defined area (cap diameter 17.5 mm, contact area 962 $mm^2$). The results for nitroglycerine uptake by this material are given in Table 4.

TABLE 4

| Contact Time (days) | Weight Increase (mg) |
|---|---|
| 1 | 25 |
| 3 | 82 |
| 5 | 123 |
| 7 | 176 |

Test 2

The method of Test 1 was followed except that a Valeryl modified N-200 Ethyl Cellulose (prepared by the process of Example 34 above) replaced the externally plasticised ethyl cellulose. The results for the nitroglycerine uptake by this material are given in Table 5.

TABLE 5

| Contact Time (days) | Weight Increase (mg) |
|---|---|
| 1 | 2 |
| 3 | 4 |
| 5 | 8 |
| 7 | 7 |

Test 3 (comparative)

The method of Test 1 was repeated except that the experiment was allowed to proceed for 30 days. The results for nitroglycerine uptake by the externally plasticised ethyl cellulose are given in Table 6.

TABLE 6

| Contact Time (days) | Weight Increase (mg) | Nitroglycerine Content (mg) |
|---|---|---|
| 1 | 30 | 28 |
| 2 | 50 | |
| 5 | 125 | |
| 10 | 210 | 213 |
| 15 | 265 | |
| 20 | 275 | |
| 30 | 290 | 285 |

Test 4

The method of Test 2 was followed except that the experiment was allowed to proceed for 30 days. The results for nitroglycerine uptake by this valeryl modified material are given in Table 7.

TABLE 7

| Contact Time (days) | Weight Increase (mg) | Nitroglycerine Content (mg) |
|---|---|---|
| 1 | 3 | 2 |
| 2 | 5 | |
| 5 | 8 | |
| 10 | 10 | 9 |
| 15 | 9 | |
| 20 | 8 | |
| 30 | 8 | 8 |

We claim:

1. An inhibitor-coated rocket motor propellant wherein the inhibitor comprises a cellulose ether ester polymer consisting essentially of a base polymer, having a chain of β-anhydroglucose units joined by ether linkages and having ether substituents wherein at least one of the β-anhydroglucose units in the chain of the base polymer is additionally substituted, by esterification of at least one hydroxyl group on the chain, by at least one organic group which contains at least two carbon atoms and is selected from the group consisting of ester groups which contain no functional groups and ester groups which contain non-cross-linking functional groups that do not react with each other or with the cellulose ether ester polymer chain.

2. An inhibitor coated rocket motor propellant according to claim 1 wherein the at least one organic group contains four or more carbon atoms.

3. An inhibitor coated rocket motor propellant according to claim 2 wherein the at least one organic group contains five or more carbon atoms.

4. An inhibitor coated rocket motor propellant according to claim 1 wherein the at least one organic group has a straight carbon chain.

5. An inhibitor coated rocket motor propellant according to claim 4 wherein the at least one organic group is a valerate group.

6. An inhibitor coated rocket motor propellant according to claim 4 wherein the at least one organic group is selected from the group consisting of a butyrate, octanoate, decanoate and dodecanoate group.

7. An inhibitor coated rocket motor propellant according to claim 1 wherein the at least one organic group has a branched carbon chain.

8. An inhibitor coated rocket motor propellant according to claim 7 wherein the at least one organic group is a trimethylacetate group.

9. An inhibitor coated rocket motor propellant according to claim 7 wherein the at least one organic group is an isovalerate group.

10. An inhibitor coated rocket motor propellant according to claim 1 wherein the carbon chain of the at least one organic group is substituted by at least one non-cross linking functional group.

11. An inhibitor coated rocket motor propellant according to claim 1 wherein the weight/weight ratio of the at least one organic group to the base polymer is between 5 and 20%.

12. An inhibitor coated rocket motor propellant according to claim 11 wherein the ratio is about 10%.

13. A method for preparing an inhibitor-coated rocket motor propellant wherein the inhibitor comprises a cellulose ether ester polymer consisting essentially of a base polymer, having a chain of β-anhydroglucose units joined by ether linkages and having ether substituents wherein at least one of the β-anhydroglucose units in the chain of the base polymer is additionally substituted, by esterification of at least one hydroxyl group on the chain, by at least one organic group which contains at least two carbon atoms and is selected from the group consisting of ester groups which contain no functional groups and ester groups which contain non-cross-linking functional groups that do not react with each other or with the cellulose ether ester polymer chain, said method comprising the steps of:

(a) forming a cellulose ether ester polymer by reacting, in an organic solvent, a cellulose ether polymer with a compound selected from the group consisting of a monobasic aliphatic acid and an aromatic carboxylic acid; and (b) coating the rocket motor propellant with the cellulose ether ester polymer obtained from step (a).

14. A method according to claim 13 wherein the solvent is xylene.

15. A method according to claim 13 wherein the solvent is selected from the group consisting of benzene, toluene, butylacetate and methylene chloride.

16. A method for preparing an inhibitor-coated rocket motor propellant wherein the inhibitor comprises a cellulose ether ester polymer consisting essentially of a base polymer, having a chain of β-anhydroglucose units joined by ether linkages and having ether substituents wherein at least one of the β-anhydrocglucose units in the chain of the base polymer is additionally substituted, by esterification of at least one hydroxyl group on the chain, by at least one organic group which contains at least two carbon atoms and is selected from the group consisting of ester groups which contain no functional groups and ester groups which contain non-cross-linking functional groups that do not react with each other or with the cellulose ether ester polymer chain, said method comprising the steps of:

(a) forming a cellulose ether ester polymer by reacting, in an organic solvent, a cellulose ether polymer with a compound selected from the group consisting of a monobasic aliphatic acid chloride, a monobasic aliphatic acid anhydride, an aromatic acid chloride and an aromatic acid anhydride; and (b) coating the rocket motor propellant with the cellulose ether ester polymer obtained from step (a).

17. A method according to claim 16 wherein the solvent is pyridine.

* * * * *